United States Patent
Hoang et al.

(10) Patent No.: US 7,868,506 B2
(45) Date of Patent: Jan. 11, 2011

(54) FLUX-SWITCHING DUAL EXCITATION ELECTRICAL MACHINE

(75) Inventors: Emmanuel Kiên Lôc Hoang, Paris (FR); Michel Roger René Lecrivain, Ivry sur Seine (FR); Mohamed Gabsi, Cachan (FR)

(73) Assignee: Centre National de la Recherche Scientifique (CNRS), Paris (FR)

( * ) Notice: Subject to any disclaimer, the term of this patent is extended or adjusted under 35 U.S.C. 154(b) by 57 days.

(21) Appl. No.: 12/299,002

(22) PCT Filed: Mar. 8, 2007

(86) PCT No.: PCT/EP2007/052167

§ 371 (c)(1),
(2), (4) Date: May 27, 2009

(87) PCT Pub. No.: WO2007/101876

PCT Pub. Date: Sep. 13, 2007

(65) Prior Publication Data

US 2010/0038978 A1    Feb. 18, 2010

(30) Foreign Application Priority Data

Mar. 8, 2006    (FR) .................................. 06 02058

(51) Int. Cl.
H02K 19/16    (2006.01)
H02K 19/24    (2006.01)
H02K 21/44    (2006.01)

(52) U.S. Cl. .................. 310/181; 310/154.11; 310/162; 310/168; 310/171; 310/216.075

(58) Field of Classification Search ............ 310/154.11, 310/154.22, 154.29, 162, 168, 171, 179, 310/181, 184, 216.075, 216.076, 216.112
See application file for complete search history.

(56) References Cited

U.S. PATENT DOCUMENTS

| 3,439,200 A | * | 4/1969 | Saito et al. ............... 310/49.45 |
| 3,862,445 A | * | 1/1975 | Volkrodt .................... 310/181 |
| 3,984,711 A |   | 10/1976 | Kordik |
| 5,672,925 A | * | 9/1997 | Lipo et al. ............. 310/154.11 |
| 5,825,112 A | * | 10/1998 | Lipo et al. .................. 310/181 |
| 6,051,904 A | * | 4/2000 | Akemakou .................. 310/171 |
| 6,133,664 A | * | 10/2000 | Torok et al. ................. 310/181 |
| 6,242,834 B1 | * | 6/2001 | Akemakou .................. 310/162 |
| 6,342,746 B1 | * | 1/2002 | Flynn ......................... 310/181 |

(Continued)

FOREIGN PATENT DOCUMENTS

EP    0 394 527    10/1990

(Continued)

*Primary Examiner*—Tran N Nguyen
(74) *Attorney, Agent, or Firm*—Blakely, Sokoloff, Taylor & Zafman

(57) ABSTRACT

Flux-switching electrical machines. In particular, a flux-switching electrical machine having a stator and a rotor. The stator has permanent magnets, armature windings and excitation windings, and the rotor has no winding or permanent magnet but includes a plurality of flux-switching teeth. The stator is generally formed by a succession of elementary cells, each cell being intended to interact with only a single tooth of the rotor at a time. Each cell includes one of the permanent magnets; a first slot for at least partly housing one of the excitation windings at least; and second slots for housing one of the armature windings.

11 Claims, 6 Drawing Sheets

U.S. PATENT DOCUMENTS 6,563,244 B1 * 5/2003 Yamauchi et al. .......... 310/90.5
6,864,608 B2 * 3/2005 Kang et al. ............ 310/154.02

FOREIGN PATENT DOCUMENTS

| | | |
|---|---|---|
| FR | 2 295 610 | 7/1976 |
| FR | 2 762 158 | 10/1998 |
| FR | 2 769 422 | 4/1999 |

* cited by examiner

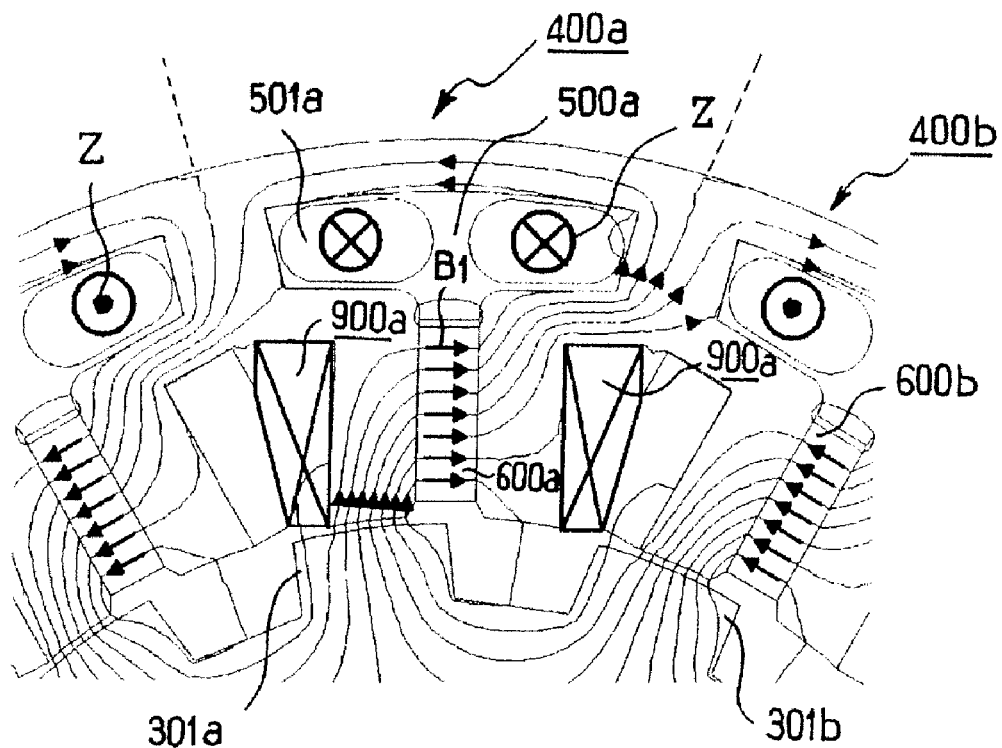
FIG_8
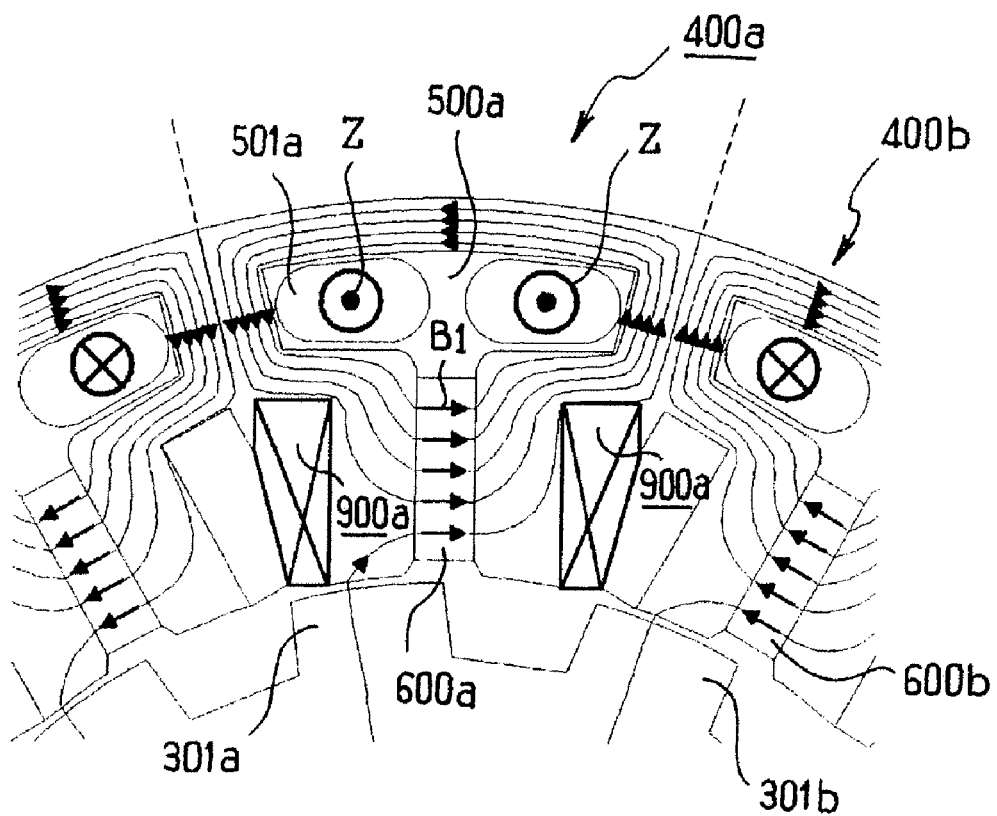
FIG_9 angle électrique

FLUX-SWITCHING DUAL EXCITATION ELECTRICAL MACHINE

This is a non-provisional application claiming the benefit of International application number PCT/EP2007/052167 filed Mar. 8, 2007.

This invention relates in general to rotating electrical machines such as alternators for automobile vehicles.

In particular, this invention relates to flux-switching rotating machines.

It is known that this type of machine has many advantages, for example, the ability to manage without the conventional use of brushes that increase the cost price, and cause operating problems, particularly due to their wear.

In general, flux-switching rotating machines have a rotor and a stator.

All electrically and magnetically active parts of the machine are located solely in the stator.

In particular, the stator is the only part containing any armature windings and permanent magnets.

Thus, since there are no active parts in the rotor, it is usually composed at least mainly of a set of ferromagnetic plates.

Such a rotor has the particular advantage of allowing very high rotation speeds because it is more uniform in appearance than rotors of the type comprising active parts.

There are also machines of this type for which excitation can be controlled.

This type of control makes these machines particularly suitable for use as alternators for vehicles, because the rotation speed in vehicle alternators can be extremely variable.

In this respect, document FR 2769 422 suggests a flux-switching rotating machine in which the excitation can be regulated by combining at least one permanent magnet in the stator, capable of setting up a local magnetic flux looping back on itself in a circumferential direction of the stator and at least one excitation winding capable of setting up a variable local magnetic flux in the circumferential direction opposite to the direction of the flux produced by the magnet(s).

More precisely, as shown in FIG. 1, the stator 1 comprises a series of elementary cells C each intended to interact with a tooth 3 of the rotor 2 and each comprising either a magnet A, or a slot E into which a part of an excitation winding is housed, or a slot I into which part of a winding of the armature is housed, or an empty slot V.

Magnets A are arranged such that the fields B in these magnets are polarised in the same direction.

In fact, in FIG. 1, these fields are all polarised in the clockwise direction along a circumferential direction.

Such a rotating machine can be used to vary the amplitude of magnetic fluxes generated in the stator, by varying the value of a current circulating in the excitation windings.

Although such a machine provides many services, it does have some disadvantages.

One particular disadvantage of such a layout of active elements in the stator is that it is too large, particularly due to the presence of conductors.

Furthermore, construction of the stator is relatively complex due to necessary intersections between conductors in different windings, which, in particular, hinders the industrialisation process.

Furthermore, depending on chosen orientations of fields B in this machine, driving the rotor in rotation requires an excitation current in the excitation windings that is greater than zero, which reduces the efficiency of the machine.

One purpose of the invention is to disclose a flux-switching dual excitation rotating machine that overcomes the disadvantages of the state of the art.

One particular purpose of the invention is to provide a flux-switching dual excitation rotating machine with simple construction.

Another purpose of the invention is to provide a machine of this type with enhanced performances, particularly in terms of torque.

Another purpose of the invention is to provide a dual excitation machine with local flux compensation and therefore inductions thus limiting iron losses. This result is particularly beneficial at high speeds.

Consequently, the invention discloses an electrical machine with flux switching comprising a stator and a rotor, the stator comprising permanent magnets, armature windings and excitation windings, the rotor not having any windings or permanent magnets, and comprising a plurality of flux switching teeth, characterised in that the stator is formed in particular by a sequence of elementary cells, each designed to interact with a single tooth of the rotor at a time, and each comprising:

one of the permanent magnets, and
a first slot to house at least part of at least one of the excitation windings;
second slots to house one of the armature windings.

Other preferred but non-limitative aspects of the machine are as follows:

in each machine, the permanent magnet and the first slot are aligned along a radial direction;
for each elementary cell, the excitation windings and the permanent magnet are arranged in the same first slot;
in each cell, the second slots are at a significantly equal radial distance from a rotation axis of the rotor;
second slots extend on each side of the permanent magnet;
each elementary cell also comprises a first material forming a portion of the magnetic circuit located at the periphery of the stator and designed to at least partially enclose a flux generated by the excitation windings and/or the permanent magnets;
the first material forming a portion of the magnetic circuit has a thickness e such that the magnetic force of the excitation winding(s) is greater than or equal to a predetermined threshold value;
each cell also comprises at least one second ferromagnetic material separating the permanent magnet from the armature winding;
the first and second materials are in a single-piece and form approximately a U facing the rotation axis of the rotor;
in each cell, the permanent magnet and the first slot generally form a T, as seen from the rotation axis of the rotor;
excitation windings are subdivided in the first slots of two adjacent elementary cells.

Other aspects, purposes and advantages of the invention will become clear after reading the following description of the invention with reference to the appended drawings in which:

FIG. 1, already commented upon, diagrammatically shows a flux-switching dual excitation rotating machine according to the state of the art;

FIG. 2 diagrammatically shows a rotating machine according to the invention with its elementary cells distributed around the rotor following a perimeter of the stator;

FIG. 3 diagrammatically shows a plane view along a direction parallel to the axis of rotation of the rotor, showing two cells laid out according to a preferred embodiment of the invention;

Figure 6:
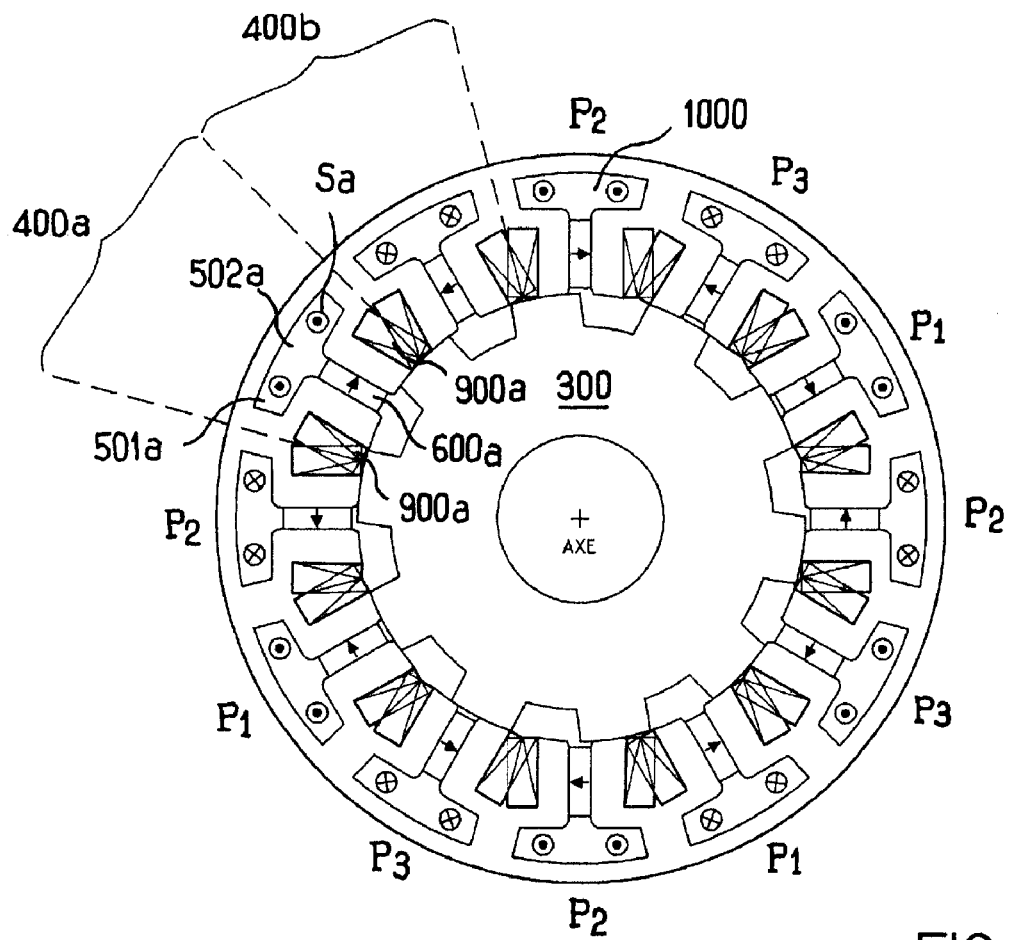
Figure 7:
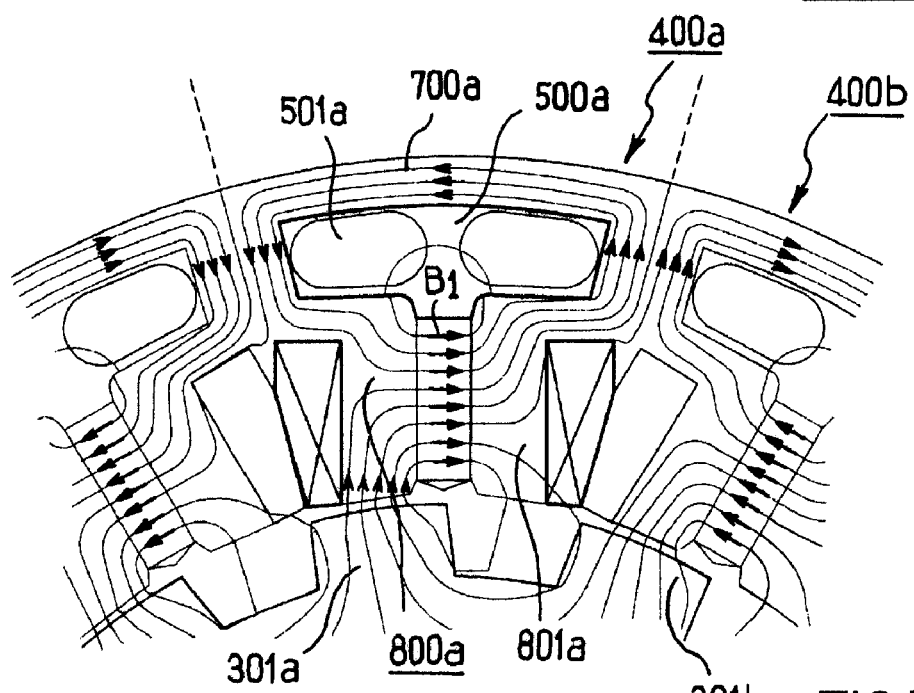
Figure 10:
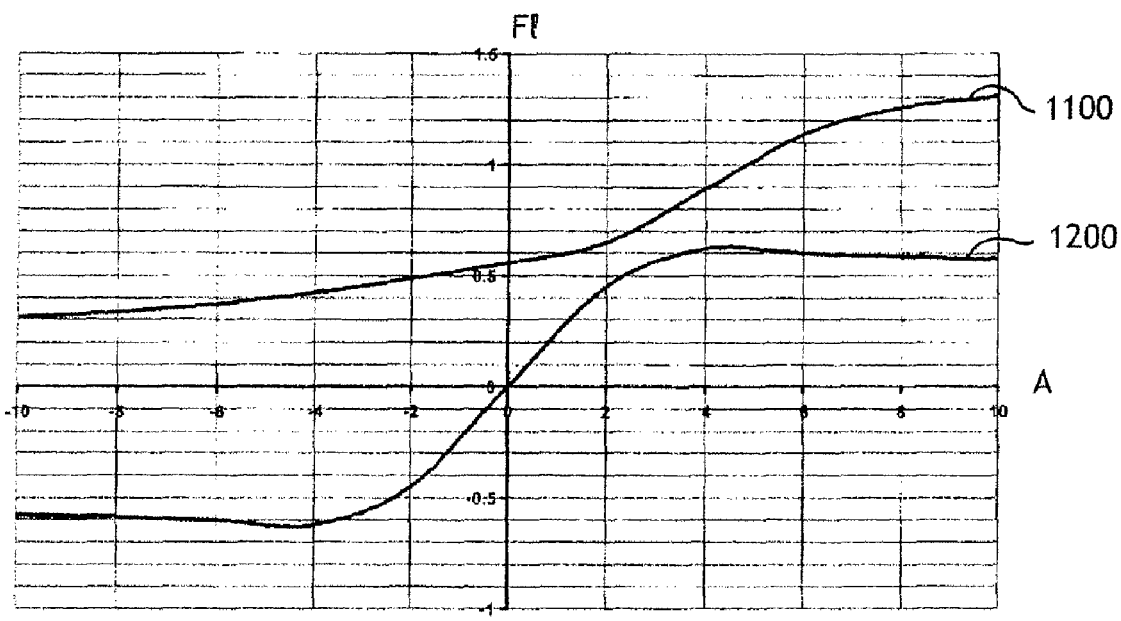
Figure 11:
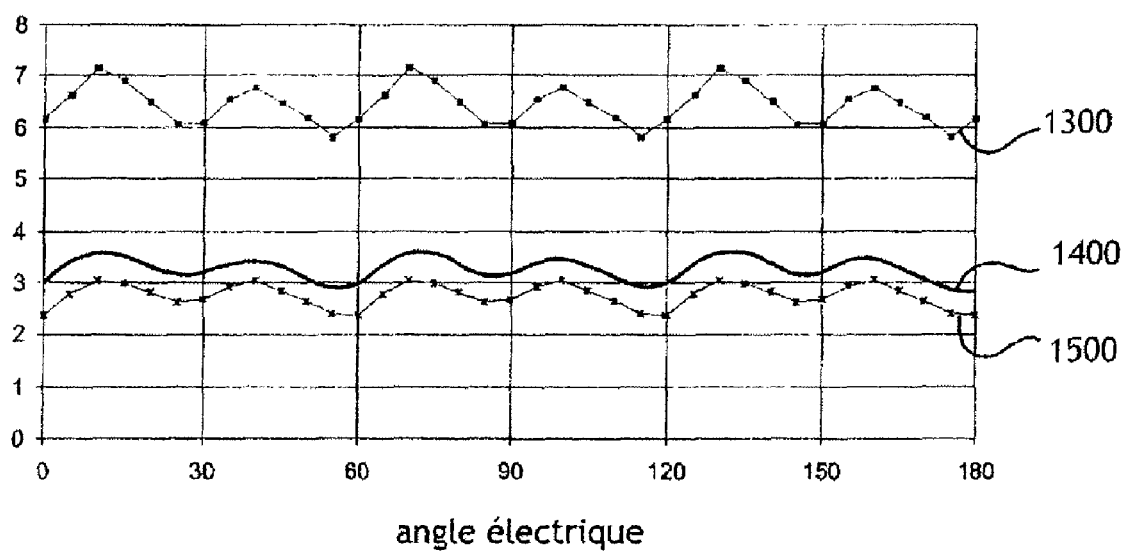

FIG. 6 diagrammatically shows a plane view along the direction of the axis of rotation of the rotor, showing the machine according to a preferred embodiment of the invention;

FIG. 7 shows the magnetic fluxes involved in cells when the excitation current is approximately zero;

FIG. 8 shows the magnetic fluxes involved in these cells when the excitation current is positive;

FIG. 9 shows the magnetic fluxes involved in these cells when the excitation current is negative;

FIG. 10 graphically shows the amplitude of the flux in the machine according to the invention with and without a permanent magnet in the stator as a function of an excitation current provided in the excitation windings, as a non-limitative example, and FIG. 11 graphically illustrates a non-limitative example showing the machine torque as a function of an electrical angle, under conditions in which the stator comprises excitation windings only, permanent magnets only, or a combination of the above-mentioned windings and magnets.

Figure 1:
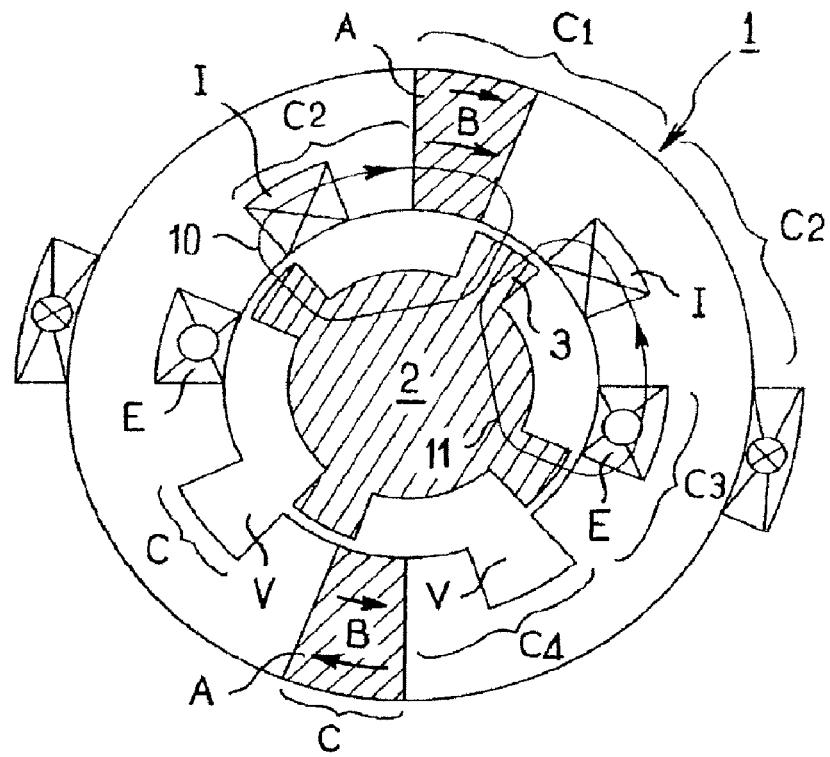
Figure 2:
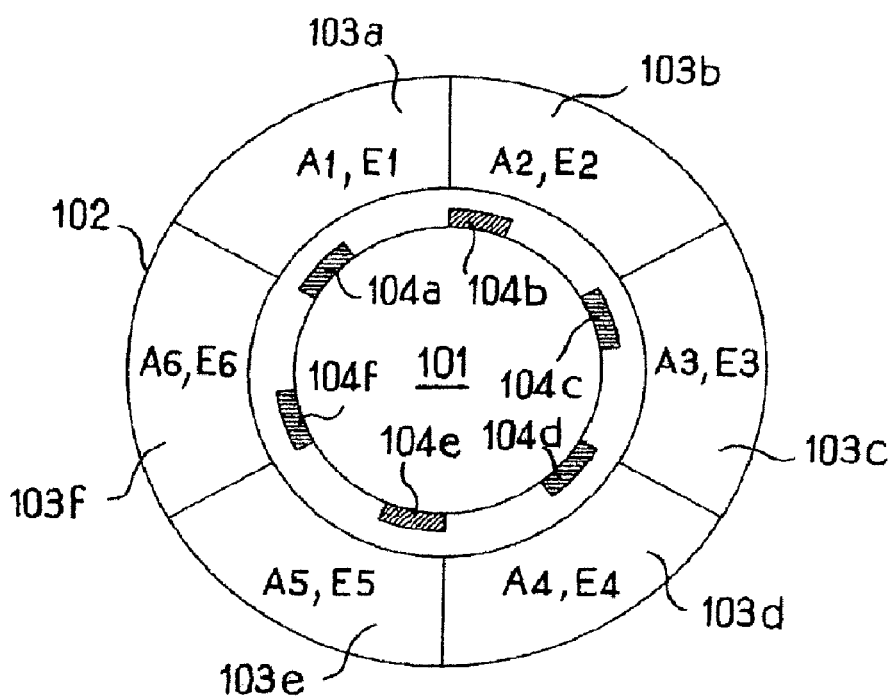

With reference to FIG. 2, the figure diagrammatically shows a flux-switching dual excitation rotating machine 100 according to the invention.

The machine comprises a rotor 101 provided with a plurality of teeth 104, and surrounded by a stator 102.

As a non-limitative example, the stator may comprise six elementary cells 103a to 103f distributed around the perimeter of the stator and therefore around the rotor.

In principle, in this text, each cell is defined as being capable of interacting with a single one of said teeth in the rotor 101.

For example, the angular configuration of the rotor presented in FIG. 2 is such that the cell 103a interacts only with tooth 104a and so on.

Each elementary cell 103 comprises a permanent magnet Ai and a first slot to at least partly house one or several excitation windings Ei.

Such an arrangement makes it easy to have magnetic fields generated by the magnet Ai and excitation winding Ei within a single cell compensating each other locally.

It is thus advantageously very easy to reduce the electromagnetic losses of the machine.

In each cell, the fields may have a very large amplitude, but the resultant within the cell may be reduced by an appropriate arrangement of said magnet and said winding.

As a non-limitative example, if it is assumed that the winding generates a field of 1.0 Teslas in the direction opposite to a second field of 1.5 Teslas generated by the magnet, the resultant within the cell is 0.5 Teslas in the direction of the second field.

On the contrary, in an arrangement in which each cell does not comprise a combination of the magnet and the excitation winding, and particularly if the cell comprises the magnet Ai and its adjacent cell comprises the winding Ei, the resulting field within each cell is maximum, namely it is equal to the field generated by the active part in the cell in question (firstly the field generated by the permanent magnet Ai, and secondly the field generated by the winding Ei).

Thus the losses in such a machine are high.

We will now describe one preferred embodiment of the invention in more detail.

Figure 3:
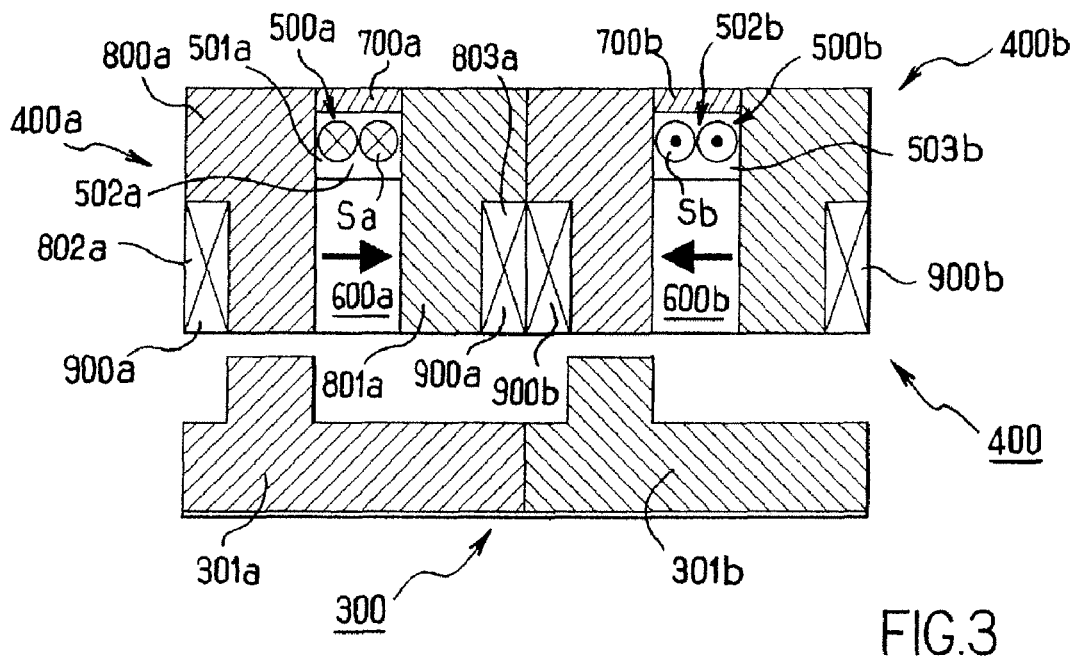

Refer firstly to FIG. 3, which diagrammatically shows a part of the machine only.

More precisely, it shows two teeth 301a and 301b of a rotor 300 interacting with two elementary cells 400a and 400b respectively of a stator 400.

Each tooth faces a region of the corresponding cell that is located at the closest distance from the rotation centre of the rotor.

Now considering the elementary cell 400a as a non-limitative example, this cell comprises a slot 500a to house part 501a and part 502a of two excitation windings 501 and 502.

These parts 501a and 502a are housed at the left and at the right of the slot respectively considering the clockwise direction about the axis of rotation of the rotor or the machine.

Conductors in these windings can carry a current along the direction denoted by the symbol Sa.

Therefore as shown in this cell, the current in the two winding parts 501a and 502a is expected to exit from the slot upwards out of the plane shown in the figure.

Obviously, it would always be possible for the currents in these windings to be in the opposite direction, for example in another view illustrating another operating condition of the machine.

In the adjacent cell 400b, a slot 500b has also been provided to contain another part of one of the previous windings.

In particular, since cell 400b is located to the right of cell 400a, the slot 500b houses another part 502b of the winding 502, because as previously mentioned, since this winding is housed to the right of the slot 500a, the path between the left and the right parts of the corresponding slots 500a and 500b is the shortest.

Obviously, winding 501 in cell 400a has another part in the slot of another adjacent cell not shown.

More precisely, since this winding 501 is at the left in the slot 500a, said other part is naturally housed in the slot of the cell directly adjacent to it at the left (not shown).

This comment is also true for the adjacent cell to the right of cell 400b and so on.

In particular, slot 500b houses part 502b of winding 502 in its left area and a part 503b of another winding 503 in its right area, this other part of this other winding in turn being located in the left area of the slot of a cell (not shown) that is two steps to the right of cell 400b.

FIG. 3 shows also that part 502b carries the same current in slot 500b as part 502a, and in this case, this current is downwards into the plane of the figure in cell 400b (as shown by symbol Sb).

In addition to slot 500a, cell 400a comprises a slot to house a permanent magnet 600a.

This slot and slot 500a are aligned along a radial direction relative to the centre of the rotor.

Preferably, these two slots are arranged adjacent to each other along this direction.

Furthermore, the sum of their corresponding heights (along the radial direction) is almost equal to the height of the cell.

This cell height is significantly greater due to the presence in said radial alignment of a first ferromagnetic material 700a with height e.

We will subsequently refer to this height e, denoting it by thickness e.

More precisely, this material is adjacent to slot 500a of the excitation winding 501 and 502 so as to provide controlled amplification of a magnetic force in this winding when the current passes through it.

This force can be controlled particularly by varying the thickness e.

Thus, at the time of the machine design, this thickness e will be determined as a function of other elements in the cell, and depending on a chosen minimum value of the required force.

The assembly composed of slot 500a, magnet 600a and the first material extend along said radial direction approximately at the centre of cell 400a.

Two second ferromagnetic materials 800a and 801a are provided on each side of this assembly, in other words on the left and on the right sides.

These are fixed to the first material 700a and they are preferably all three made from a single piece.

One particular advantage is that the simple construction of these three materials makes the stator according to the invention very stiff.

Furthermore, the first and second materials are approximately in the form of a U facing downwards.

The two parts of the two excitation windings and the permanent magnet are located in the opening of the U.

Each of the second materials comprises a second slot 802a and 803a to house an armature winding 900a.

These slots, with exactly the same shape, are arranged symmetrically about a radial axis, on each side of the permanent magnet.

In particular, they are arranged in an offset formed in the second materials.

They are also arranged such that the winding 900a can surround this magnet.

Thus for example, the armature winding 900a may be wound downwards into the plane of the figure in slot 802a located to the left of the assembly, and upwards out of the plane of the figure in slot 802a located to the right of said assembly.

And the connection between these two slots is defined by two winding heads not shown, in which the conductors are wound to the left and to the right respectively to pass in front of the second materials and the permanent magnet 600a.

It should be noted that these heads plus the two parts of an excitation winding housed in two slots form a complete winding.

It should also be noted that preferably, the height of slots 802a and 803a is approximately equal to the height of the permanent magnet 600a.

Furthermore, always according to the preferred embodiment of the invention, the second slot 803a communicates with the second slot located to the left in cell 400b.

This communication principle is also applicable to the second slot 802a with the slot that is to the right in the cell not shown located to the left of said cell 400a.

Figure 4:
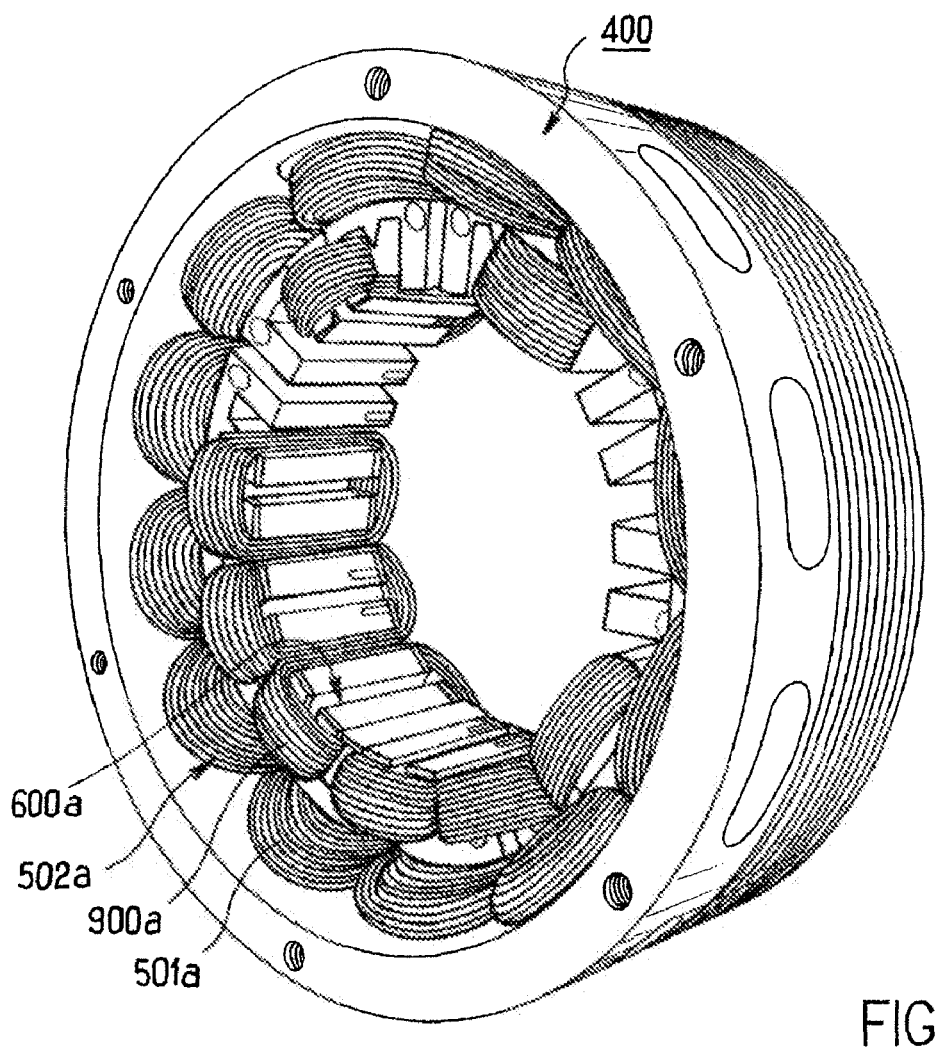
FIG. 4 shows a perspective view of the stator according to a preferred embodiment of the invention.
Figure 5:
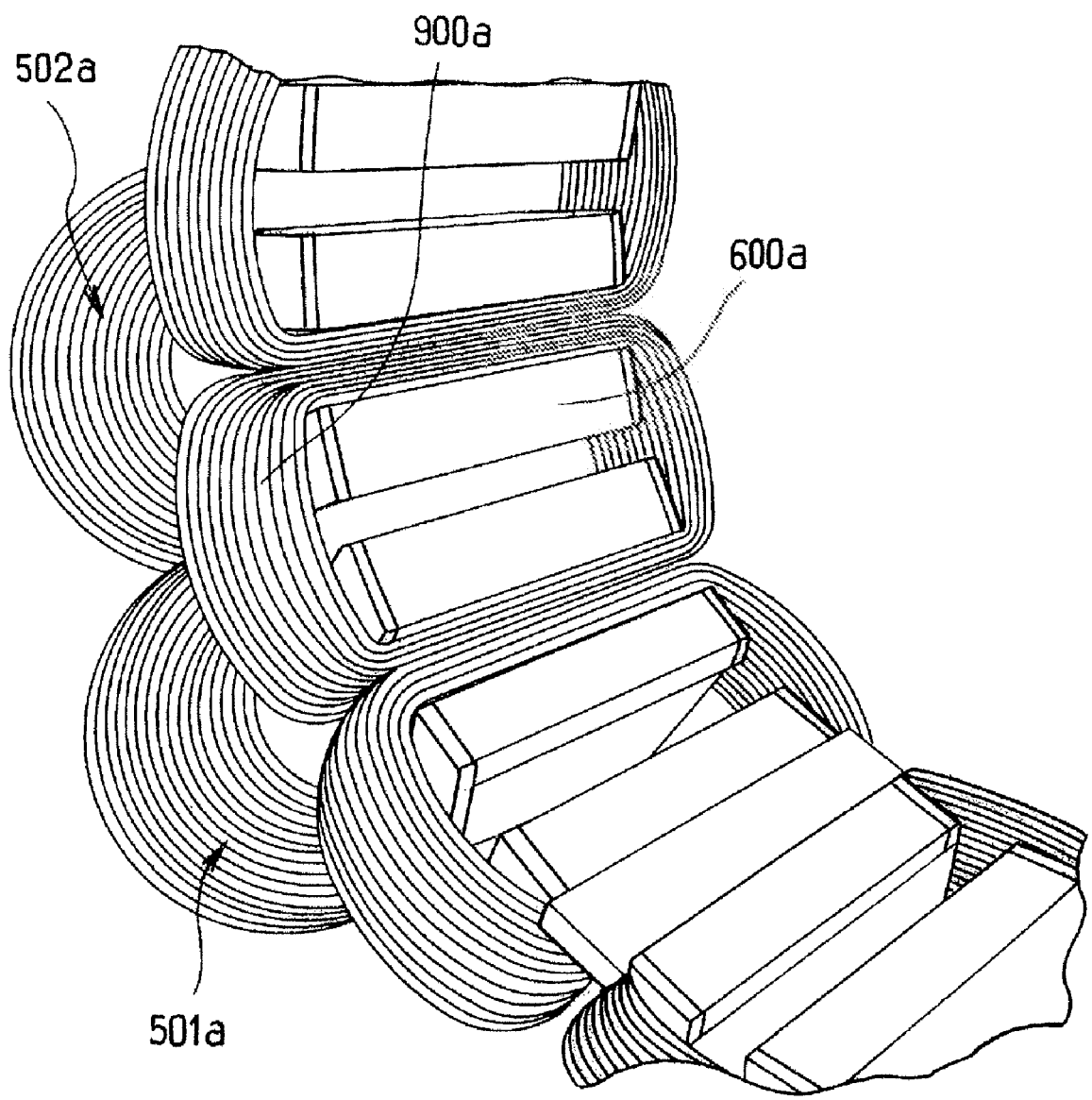
FIG. 5 shows an enlarged view of the stator in FIG. 4.

FIG. 4 shows the stator as a whole without the first material so that the figure is more easily understandable, FIG. 5 shows an enlarged view of this stator and FIG. 6 shows a plan view of the stator and the rotor according to the preferred embodiment of the invention that is less diagrammatic than FIG. 3 discussed above.

In particular, FIGS. 4 and 5 show that the following are located in the annular structure of the stator:
armature and excitation windings in each cell, and
slots for magnets in each cell.

Furthermore, these figures and particularly FIG. 6 show that said assembly, namely the permanent magnet (or its slot) and the excitation winding (or the first slot provided to house this winding) in each cell, are usually T-shaped (see reference 1000 in FIG. 6 that refers to a cell in which said assembly is cross-hatched).

Alternation of current directions in the windings can be seen in a more detailed manner than in FIG. 3, using the Sa and Sb symbol types mentioned above.

It also shows the arrangement of the three phases P1 to P3 necessary for the three-phase type of machine presented herein as a non-limitative example.

We will now describe operation of the machine manufactured according to the preferred embodiment of the invention.

Firstly, operation of the rotor with the stator will not be described in detail, because this operation is conventional and is known in itself in flux-switching machines.

Thus, to facilitate understanding of the following text, we will simply mention that since the stator is fixed, the rotor will rotate around its axis due to a controlled variation of the magnetic fields in the stator and currents in the armature windings at the stator.

FIG. 7 diagrammatically shows magnetic fluxes involved in said rotation of the rotor at an elementary cell.

It is also important to note that this figure shows these fluxes when excitation currents in the excitation windings are less than a predetermined threshold value and thus when the magnetic fields generated by these windings are negligible in comparison with the magnetic fields generated by the permanent magnets.

Considering cell 400a as a non-limitative example, the magnetic field of permanent magnet 600a is denoted B1.

At this magnet, flux lines extend around the perimeter of the stator, and from left to right in this example.

It can also be seen that permanent magnets in the machine have been arranged such that field B1 in a cell is in the direction opposite to the corresponding fields B1 in the two cells adjacent to the cell considered.

For example in cell 400a, at the magnet, the field B1 is oriented in the clockwise direction, whereas, in adjacent cells, for example in cell 400b, the field is oriented in the anticlockwise direction.

In the angular configuration of the rotor shown as a non-limitative example in FIG. 7 (and in FIGS. 8 and 9), some of the lines of magnetic field B1, and particularly a part that is closest to the slot 501a of the excitation winding, passes through the second ferromagnetic material 801a by passing around said slot 500a in the anticlockwise direction to return to the permanent magnet.

Therefore, it passes through the first material 700a and then through the second material 800a.

Another part of the field lines, and particularly a part located approximately equidistant from the slot 501a and the tooth 301a of the rotor, passes through the permanent magnet in the clockwise direction along the said perimeter and tends to join the path mentioned above.

Furthermore, the lines that pass through the magnet originate from tooth 301a of the rotor.

They correspond to field lines that are associated with at least one of the adjacent cells and that pass through the rotor.

In particular, according to this angular configuration, some of these lines originate from the permanent magnet of the cell at the left, and other lines originate from the permanent magnet of the cell at the right.

It should be noted that these lines may also correspond to some of the lines that will be described below.

A last part of the field lines, and particularly a part closest to tooth 301a, passes through the permanent magnet in the clockwise direction and passes through the second material 801a, in this case going towards the rotor.

In this angular configuration, tooth 301b then facing cell 400b is at a distance from the magnet such that some of these latter field lines (but in this example only a small proportion of them) can pass through this tooth 301b, go around the periphery of the rotor, and exit from the rotor through tooth 301a to loop back to permanent magnet 600a.

However, still in this configuration, a large proportion of these lines loops back locally onto the permanent magnet without passing through the rotor.

Obviously, the above description is not exhaustive and is simply an illustration.

Those skilled in the art will understand that due to the physical phenomena involved, an attempt to describe all fluxes present in the machine in an extremely precise manner would be in vain and in any case not very useful.

FIG. 8 shows fluxes in the same part of the machine, but a positive excitation current passes through the excitation windings, for example the windings in winding slot 500a (see symbols Z).

A positive current means a current along a direction such that the electromagnetic field generated by the excitation winding is at least partly additional to the field of the permanent magnet so as to increase the flux in the armature windings.

In this case, and in the above-mentioned angular configuration of the rotor, most field lines passing through the permanent magnet originate from tooth 301a.

And more precisely, these lines may originate from the permanent magnets of the two adjacent cells after passing through the rotor and particularly the teeth facing these two cells.

On the other side of the permanent magnet, part of the field lines propagates in the first material 700b of cell 400b to loop back onto magnet 600b, after having partly bypassed slot 500b.

And the other part of these lines bypasses the slot 500a on its right side, particularly by passing through the first material 700a, and then propagating in the adjacent cell to its left towards its permanent magnet.

Thus, there is mainly one loopback defined successively by magnet 600a, the first material 700b, magnet 600b, tooth 301b and tooth 301a.

And there is another loopback with magnet 600a, the first material 700a, magnet in the cell to the left, the tooth facing this cell and tooth 301a.

FIG. 9 also shows fluxes in the same part of the machine as a non-limitative example, but a negative excitation current passes through the excitation windings, for example windings in slot 500a (see symbols Z).

In this case, most fluxes no longer pass through the rotor and particularly through its teeth.

And the fluxes loop back inside a single cell without passing through another cell.

More precisely, fluxes in a cell form a single loop inside the cell, in particular passing through the permanent magnet (for example 600a), bypassing the excitation winding slot particularly through the first material (for example 700a in the anti-clockwise direction) to return finally to the magnet.

As those skilled in the art will have understood, magnetic fluxes described with reference to FIGS. 7 to 9 are such that they can control the magnetic flux in the armature windings of the stator.

In particular, when a negative current passes through the excitation windings, the magnetic flux in the armature windings tends to cancel out, while when a positive current passes through the excitation windings, the magnetic flux tends to increase.

FIG. 10 shows a variation of the amplitude of fluxes (ordinates) as a function of the amplitude of the excitation current (abscissas) as an illustration and non-limitatively.

Furthermore, this figure contains a first curve 1200 corresponding to a machine without a permanent magnet in each cell, and a second curve 1100 corresponding to a machine made according to the preferred embodiment of the invention, to illustrate the advantage of combining a permanent magnet with an excitation winding.

It should be noted herein that the values of the coordinates on the axes should be considered for guidance only.

As can be seen, the amplitude of fluxes on curve 1100 is always greater than the amplitude on curve 1200, which shows improved performances of the machine, particularly in terms of torque.

In this respect, FIG. 11 diagrammatically shows variation of the torque as a function of the electrical angle, considering three different cases.

In the first case shown by curve 1500, the machine operates due to the excitation windings alone, in other words the permanent magnets are not active, and magnets in the armature windings are alternating depending on the angular position of the rotor.

In the second case shown by curve 1400, only the permanent magnets are active, in other words the current in the excitation winding is negligible or zero. The torque necessary to rotate the machine rotor is created by interaction of currents in the armature windings and fluxes due to the permanent magnets.

Finally, in the third case shown in curve 1300, the actions of permanent magnets, excitation windings and armature windings are combined.

As might be expected, the combination of the above-mentioned active parts results in a better torque.

Also more precisely, unlike what might be expected and to the surprise of the applicant, it can be seen that curve 1300 is higher than a simple superposition of curves 1400 and 1500.

In other words, the machine according to the preferred embodiment of the invention benefits from advantageous synergy effects that provide torque performances that are much better than a simple addition of the torques obtained for the first and second cases mentioned above.

In this respect, the applicant believes that local compensation of the magnetic field in each cell mentioned above contributes to a certain extent to such an effect.

Obviously, this invention is in no way limited to the embodiment described above and shown in the drawings.

In particular, according to one variant of the embodiment described above, elements within a cell may be arranged differently.

For example, the positions of slot 500a of the excitation winding and slot 600a of the permanent magnet can be inverted, such that the permanent magnet is further from the rotor.

It should be noted that in this case, the second material 700a should preferably be located on the inner periphery of the cell, in other words at its low end seen from the centre of rotation, or between the tooth of the rotor and slot 500a.

According to another variant, cells arranged according to the preferred embodiment of the invention can be used with other cells arranged according to the previous variant embodiment.

According to another variant, slot 500a may house a part of a single excitation winding (and not two parts of two windings as in the preferred embodiment).

Another part of this winding will be housed exclusively in slot 500b of adjacent cell 400b.

According to yet another variant, adjacent slots 900a of the armature winding between two cells will be isolated.

Having seen the above description, the advantages of this invention are easy to perceive, and some of them have already been discussed.

Specifically concerning ease of manufacturing and dimensions, the description and particularly the drawings make it clear that these aspects have been significantly improved.

Such an improvement is particularly due to arrangements of windings relative to each other, particularly to limited intersections between the different conductors and the use of the first material as an element contributing to both the electrical and mechanical performances (stiffness, etc.) of the machine.

The invention claimed is:

1. Flux switching electrical machine comprising a stator (400) and a rotor (300), the stator comprising permanent magnets (600*a*, 600*b*), armature windings (900*a*, 900*b*) and excitation windings (501, 502), and the rotor not having any windings or permanent magnets, and comprising a plurality of flux switching teeth (301*a*, 301*b*), wherein the stator is formed by a sequence of elementary cells (400*a*, 400*b*), and wherein each of said elementary cells is designed (400*a*) designed to interact with a single flux switching tooth of said flux switching teeth of the rotor at a time, and each comprising:
one of the permanent magnets (600*a*),
a first slot (500*a*) to house at least part of at least one (501*a*) of the excitation windings (501) and;
second slots (802*a*, 803*a*) to house one (900*a*) of the armature windings.

2. Machine according to claim 1, wherein each of said elementary cells (400*a*), the permanent magnet (600*a*) and the first slot (500*a*) are aligned along a radial direction.

3. Machine according to one of the previous claims, wherein each of said elementary cells, the excitation windings and the permanent magnet are arranged in the same first slot (500*a*).

4. Machine according to one of the previous claims, wherein each of said elementary cells (400*a*), the second slots (802*a*, 803*a*) are at an approximately equal radial distance from a rotation axis of the rotor (300).

5. Machine according to one of the previous claims, wherein the second slots (802*a*, 803*a*) extend on each side of the permanent magnet (600*a*).

6. Machine according to one of the previous claims, wherein each of said elementary cells further comprises a first material forming a portion of the magnetic circuit (700*a*) located at the periphery of the stator and designed to at least partially enclose a flux (B1) generated by one of the excitation windings and the permanent magnet.

7. Machine according to claim 6, wherein the first material forming a portion of the magnetic circuit (700*a*) has a thickness e such that the magnetic force of the excitation winding(s) (501*a*, 502*a*) is greater than or equal to a predetermined threshold value.

8. Machine according to one of the previous claims, wherein each of said elementary cells (400*a*) also comprises at least one second ferromagnetic material (800*a*, 801*a*) separating the permanent magnet (600*a*) from the winding of the armature (900*a*).

9. Machine according to one of claims 6 to 7, wherein the first material (700*a*) and second materials (800*a*, 801*a*) are in a single-piece and form approximately a U facing the rotation axis of the rotor (300).

10. Machine according to one of the previous claims, wherein each of said elementary cells (400*a*), the permanent magnet (600*a*) and the first slot (500*a*) generally form a T, as can be seen from the rotation axis of the rotor (300).

11. Machine according to one of the previous claims, wherein the excitation windings are subdivided in the first slots of two adjacent elementary cells of said elementary cells.

\* \* \* \* \*